Jan. 6, 1970 — W. F. ENGESSER — 3,487,549
SPORTS TRAINING AID
Filed Oct. 30, 1967 — 2 Sheets-Sheet 1
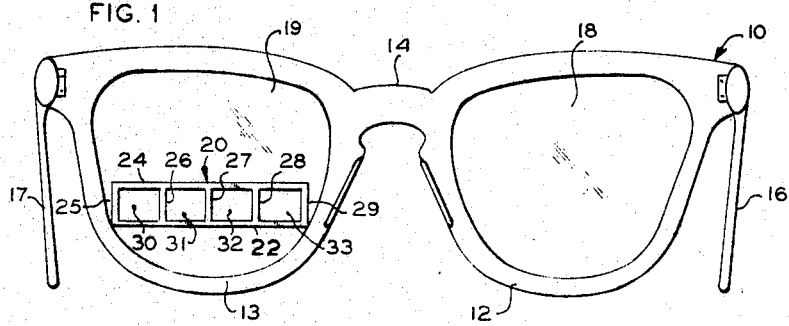
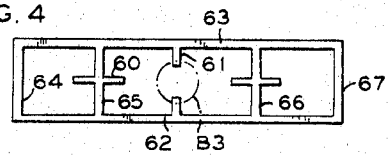
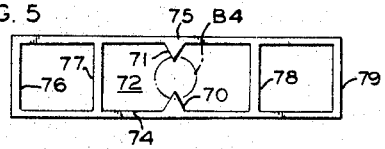
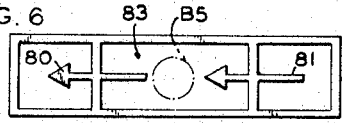
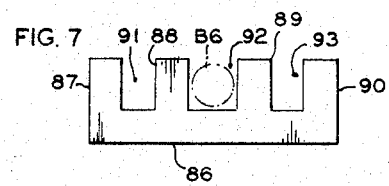
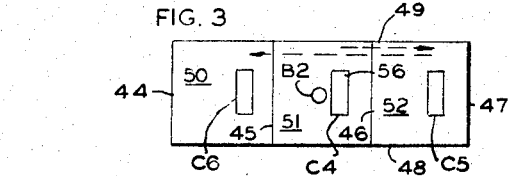
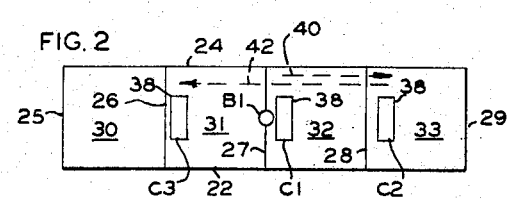
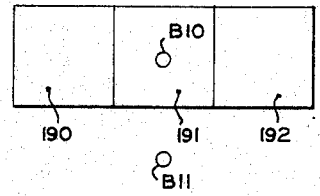
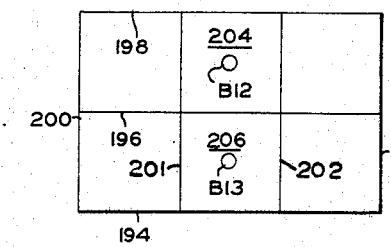
WILLIAM F. ENGESSER
INVENTOR
BY
BUCKHORN, BLORE, KLARQUIST & SPARKMAN
ATTORNEYS Jan. 6, 1970  W. F. ENGESSER  3,487,549
SPORTS TRAINING AID
Filed Oct. 30, 1967  2 Sheets-Sheet 2
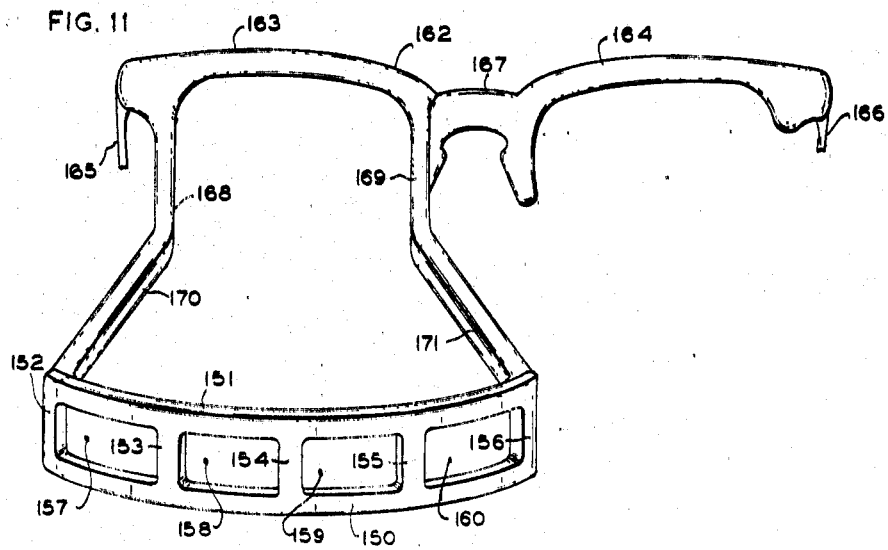
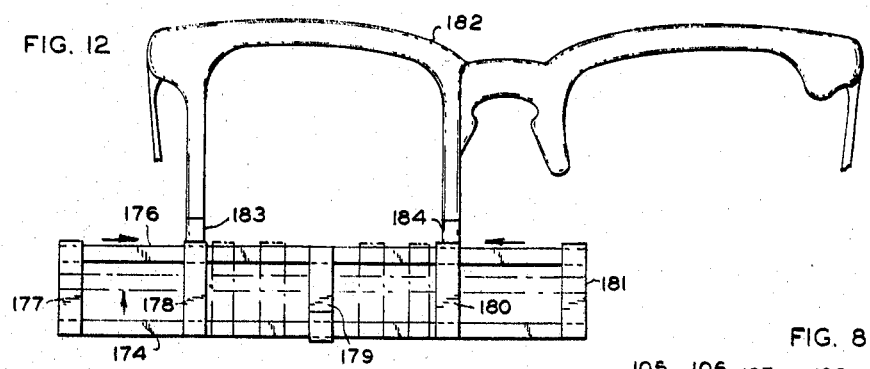
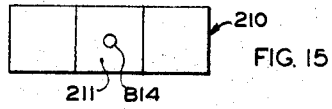
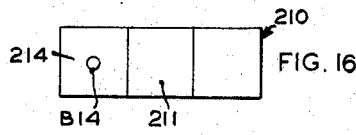
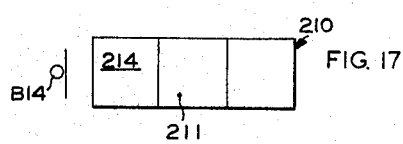
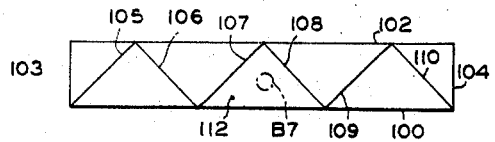
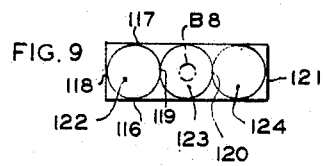
WILLIAM F. ENGESSER
INVENTOR
BY
BUCKHORN, BLORE, KLARQUIST & SPARKMAN
ATTORNEYS United States Patent Office
3,487,549
Patented Jan. 6, 1970

3,487,549
SPORTS TRAINING AID
William F. Engesser, 3130 Van Buren,
Corvallis, Oreg. 97330
Filed Oct. 30, 1967, Ser. No. 678,792
Int. Cl. G01c 15/12
U.S. Cl. 33—46                                   9 Claims

ABSTRACT OF THE DISCLOSURE

The present application discloses a training device for use by sportsmen and particularly golfers and bowlers primarily to indicate and control body, head and eye position and movement in relation to a target object, such as a golf ball or bowling ball during the swing. The device comprises a sight guide composed of a plurality of spaced vertically extending guideline elements intersected by one, two or more spaced horizontal guideline elements so as to define a series of contiguous horizontally extending target spaces within which a target object can be centered. The sight guide device is either mounted on an eye glass lens or on a spectacle-type frame in front of the dominant eye of the wearer.

BACKGROUND OF THE INVENTION

Field of the invention

The present invention relates to a training aid for sportsmen and especially golfers and bowlers, and more particularly to a sight guide device adapted to be worn in front of the wearer's eye for indicating head, eye and body position and movement relative to a ball, club or other target object.

DESCRIPTION OF THE PRIOR ART

Sight guide devices for use in conjunction with eye glass lenses to control head movement of golfers have been suggested heretofore, as shown for example in U.S. Patents 3,268,228 and 3,228,696. However, such devices, because of their peculiar construction, have been of little, if any, aid to a golfer in determining his initial body and head position relative to the ball, and of no aid in indicating the extent of any head movement that occurs during his swing of the club. Moreover, such prior devices have not aided the golfer in guiding the direction of his stroke, or in indicating the distance through which he swings his club. Furthermore, the effectiveness of prior devices has been lessened through their use in conjunction with both eyes of the wearer.

SUMMARY OF THE INVENTION

The aforementioned problems and limitations of the prior art are overcome by the present invention through the provision of a sight guide device having guidelines arranged in a pattern which defines a series of contiguous horizontally aligned target spaces. The target object, such as a golf ball, is initially centered within one of the target spaces or on a guideline separating two adjacent target spaces. Any apparent deviation of the ball from its preselected initial position during the execution of a stroke would indicate head or body movement or a combination thereof. The amount of such movement can be gauged by noting the apparent movement of the ball from its initial target space into one of the other target spaces or guidelines. Since the sight guide includes at least one horizontally extending guideline element, this element serves as a directional guide for the golf club during the swing. The distance through which the club is moved during any part of the swing can be gauged readily by noting the extent of the club's movement from one target space or vertical guideline element to another, and thus the sight guide also serves to control the distance through which the ball is hit. The sight guide is mounted in front of the wearer's dominant eye, which permits the wearer to align the ball and club with the target green with both eyes open, and then close the nondominant eye to execute the stroke.

Primary objects of the invention are to provide:

(1) a sight guide device for use in positioning the head for normal, high or low shots, and for use in detecting and controlling head, eye and body movement during the execution of any intended movement in a sporting event;

(2) a sight guide device as aforesaid which is particularly useful as a training aid for golfers in not only detecting and controlling head movement and position, but also in positioning the golfer in proper relationship to the ball and club;

(3) a sight guide device as aforesaid which serves as a directional guide;

(4) a sight guide device as aforesaid which serves as a distance guide;

(5) a sight guide device as aforesaid capable of indicating the extent and direction of head movement as well as the fact of such head movement;

(6) a sight guide as aforesaid capable of use with existing spectacles or spectacle frames, on sun glasses or in conjunction with special frames;

(7) a sight guide as aforesaid which is more versatile and accurate than prior comparable devices; and (8) a sight guide as aforesaid which is simple and inexpensive to make and use.

BRIEF DESCRIPTION OF THE DRAWINGS

The foregoing and other objects and advantages of the present invention will become more apparent from the following detailed description which proceeds with reference to the following drawings wherein:

FIG. 1 is a front view of a pair of spectacles mounting a sight guideline device in accordance with the present invention;

FIGS. 2 and 3 illustrate the use of sight guideline devices of the invention for controlling the direction and degree of a golf swing;

FIGS. 4 through 9 illustrate various patterns of sight guideline devices in accordance with the present invention;

FIG. 10 is a side view of a sight guide device having a special mounting for spectacle frames;

FIG. 11 is a front view of another sight guide embodiment of the invention for persons who prefer guideline patterns at a distance beyond the normal eye-spectacle distance;

FIG. 12 is a front view of another sight guide embodiment having adjustable sight guide elements;

FIGS. 13 and 14 illustrate the use of sight guide devices to determine vertical head position; and FIGS. 15 through 17 illustrate the use of a sight guide device to control head movement.

DETAILED DESCRIPTION

"Horizontal" and "vertical" as used herein with reference to various guideline elements refer to the normal disposition of such elements when the wearer is standing with his head and body erect and his eyes directed horizontally.

With reference to the drawings, FIG. 1 discloses a spectacle frame 10 including a pair of eye-pieces 12, 13 connected together by a nose-piece 14 and having ear-pieces 16, 17. Eye glass lenses 18, 19 are mounted within the openings defined by the eye-pieces. A sight guideline means 20 in accordance with the invention is affixed to the lens 19 for the dominant eye of the wearer. The sight guideline means includes a pair of vertically spaced horizontally extending guideline elements 22, 24 intersected by five space vertical guideline elements 25, 26, 27, 28 and 29 so as to define four rectangular target spaces 30, 31, 32 and 33 of approximately equal size.

The lens-mounted guideline device of FIG. 1 may be made, for example, of paper, metal, plastic or cloth material having a pressure sensitive adhesive backing for attachment to the lens, or such device could be attached to the lens with a transparent, pressure sensitive tape.

For wearers of glasses the sight guideline device can also be attached to the lenses of clip-on type sun glasses. For persons who do not need corrective lenses, the sight guideline device can be attached to a lensless spectacle frame, to a sunglass lens mounted in spectacle frames in the manner shown in FIG. 1, or suspended from the bill of a golf cap. For people who wear prescription lenses, the lens specification can be modified so the guideline area will place the ball in focus, and magnified if desired, at the proper distance (usually four feet). Presently many bifocal wearers wear lenses which are in focus at reading distances and at far-sight distances but not at the four-foot-golf-ball distance.

Use of the sight guide device of FIG. 1 as a training aid in playing golf is illustrated in FIG. 2. A golf ball $B_1$ lying on the ground is aligned with the center vertical guideline 27 midway between the top guideline 24 and bottom guideline 22. Any deviation from this position during the course of the stroke would indicate either head or body movement or both, and that corrective measures should be taken. The head C of a golf club such as the putter shown would then be aligned directly behind the ball as shown in position $C_1$ within target space 32. Then during the back swing, which takes place in the direction of arrow 40, the club should be moved parallel to horizontal guidelines 22 and 24 and midway between them the desired distance to a second position as indicated for example by club position $C_2$ within target space 33. Then the forward swing takes place in the direction of arrow 42, still parallel to horizontal guidelines 22 and 24, to a third club position $C_3$ within target space 31. During the swing of the club as described, the golfer concentrates on maintaining ball B in the centralized initial position shown, and if he succeeds, this will indicate to him that his head and body have been held stationary.

From the foregoing it will be apparent that the guideline device is not only useful in indicating and controlling head and body movement, but also in guiding the direction of the golf swing and the distance through which the golf club is moved in both the back swing and the forward swing. With a little practice, the golfer is able to use the guideline device as an aid in obtaining proper distance on his shot by learning to what target space he must move his club on the back swing, and in which target space his club should end up at the end of the forward swing.

FIG. 3 illustrates a guideline pattern with four vertical guideline elements 44, 45, 46, 47 intersecting two horizontal guideline elements 48, 49 to define three horizontally separated target spaces 50, 51, 52. With such a pattern the golf ball $B_2$ would ordinarily be positioned in the center of the center target space 51 with the head C of a golf club occupying the positions $C_4$, $C_5$ and $C_6$ corresponding to the positions $C_1$ $C_2$ and $C_3$ shown in FIG. 2 during the course of the swing.

FIGS. 4, 5, 6 and 7 illustrate other suitable guideline patterns in accordance with the invention, all of which are characterized by generally horizontally and vertically extending guideline elements defining a plurality of horizontally separated target spaces. In FIG. 4 partial horizontal guideline segments 60 and partial vertical guideline segments 61 supplement the full horizontal guideline elements 62, 63 and full vertical guideline elements 64, 65, 66 and 67. A golf ball $B_3$ would normally be centered between the partial vertical segments 61 and horizontal segments 60.

In FIG. 5 vertically extending pointer marks 70, 71 point to the center of a center target space 72 of a guideline pattern having three target spaces and two horizontally spaced guideline elements 74, 75 and a total of four full vertical guideline elements 76, 77, 78 and 79 defining a total of three target spaces. The target object $B_4$ would be centered between the pointer marks as shown.

The guideline pattern of FIG. 6 employs horizontally extending guide arrows 80, 81 which supplement the usual horizontal and vertical guideline elements, whereby a golf ball $B_5$ may be centered within a center target space 83, and the head of a golf club may be guided along the arrows in executing the swing.

FIG. 7 illustrates a rake-type guide pattern having only a single horizontal guideline 86 and four horizontally spaced vertical guidelines 87, 88, 89 and 90 intersecting the horizontal guideline and thus defining three target spaces 91, 92 and 93. A golf ball $B_6$ or other target object would be aligned within center target space 92 when the player's head and body are properly positioned with respect to the ball.

FIGS. 8 and 9 illustrate still further acceptable guideline patterns. In FIG. 8 the pattern includes horizontal guide segments 100, 102, vertical opposite end segments 103, 104 and diagonal but still generally vertically extending intermediate guideline segments 105, 106, 107, 108, 109 and 110 extending between the upper and lower horizontal guideline segments to define seven triangular target spaces including a center target space 112 within which a target object $B_7$ would normally be centered.

In FIG. 9 the guideline device, like the previous ones, includes horizontally extending guideline portions 116, 117 and vertically extending guideline portions 118, 119, 120 and 121. The inner boundaries of such guideline portions are curved and interconnected so as to define circular target spaces 122, 123 and 124. Normally a golf bal or other target object $B_8$ would be centered within center target space 123.

FIG. 10 illustrates a clip-on guideline device including a support means 130 for mounting a guideline portion 132 on a pair of spectacle frames 134 including eye-piece portions 135. The support 130 includes a front portion 136 mounting guideline portion 132, which has guideline elements 138 comprising interconnected bars made of a rigid material such as plastic, wood or metal. The support also includes upper arms 140 and lower arms 142 extending rearwardly toward the spectacle frames from the front support portion and having end clips 144 for clipping the arms to the eye-piece portions 135 of the frame. This arrangement would permit ready attachment and detachment of the guideline device from the spectacle frames of the wearer without physical contact with the eye glass lenses.

FIG. 11 illustrates a modified guideline device particularly suited for persons who do not wear corrective lenses. Such device includes a slight guide means made of rigid plastic or the like and having spaced horizontal guideline elements 150, 151 connected by spaced vertical guideline elements 152, 153, 154, 155 and 156 defining rectangular target spaces 157, 158, 159 and 160. The sight guideline elements are formed as an integral part of a support structure which includes a spectacle-type frame 162 including eye-piece portions 163, 164, ear-piece portions 165, 166 and a nose-piece portion 167. Eye-piece portion 163 for the dominant eye of the wearer includes vertically extending members 168, 169 and horizontal arm portions 170, 171 extending from the lower ends of the vertical members and connected to the opposite ends of the guideline means. The horizontal guideline elements 150, 151 are arcuately curved as viewed from above so that the wearer's line of sight will extend through each target area of the sight guide at right angles to such area despite the sight guide being spaced by the support frame a considerable distance in front of the wearer's eye. This spacing enables the wearer to look easily over the guideline device when desired.

FIG. 12 illustrates another modified form of sight guide device in accordance with the invention, including rigid horizontal guideline bars 174, 176 and five rigid vertical guideline bars 177, 178, 179, 180 and 181. A spectacle-type frame 182 mounts the described guideline bars in a manner similar to that described with respect to FIG. 11. The top horizontal guideline bar 176 is rigidly affixed to horizontal arm portions 183, 184 of the frame, and center vertical guideline bar 179 is rigidly affixed to the top horizontal guideline bar. However, bottom horizontal guideline bar 174 is mounted to fixed center vertical guideline bar 179 for vertical sliding movement relative thereto for adjustment for the vertical dimension of the various target spaces defined by the horizontal and vertical elements. Similarly, all of the vertical guideline bars except center bar 179 are mounted for horizontal sliding movement on fixed top horizontal guideline bar 176 so that the horizontal dimension of the target spaces defined by the elements can also be varied to suit the wearer. Various possible alternative positions of vertical guide bars 178 and 180 are indicated in phantom lines in FIG. 12.

From the foregoing it will be apparent that both the dimensions and the pattern of the sight guideline device can be designed to suit the wearer. The image pattern for a given guideline device can also be varied to suit the golfer. For example, in FIG. 13, showing a sight guide defining three rectangular target spaces 190, 191, 192, the golfer may desire to change his image pattern depending on the distance he desires to obtain with a given shot. For some shots a golfer might find that he wants the golf ball in position B9 of FIG. 9, for other shots in position B10 and for still further shots in position B11.

For the correct position of the head for different types of shots, the golfer may prefer a double set of target spaces as shown in FIG. 14. Such a guideline pattern includes three vertically space horizontal guidelines 194, 196 and 198 in addition to four vertical guideline elements 200, 201, 202 and 203 defining two horizontal rows of three target spaces each. For short shots, as in putting, the golfer might want the ball positioned in the center of the top center target space 204 at position B12, but for longer shots using woods and irons he might want the ball in position B13 at the center of the lower center target space 206.

FIGS. 15, 16 and 17 illustrate the use of a three-target space sight guideline pattern 210 for irons and woods play. It is recognized that some head movement may be desirable during the back swing according to the individual golfer's style. FIGS. 15, 16 and 17 show three alternative head movement positions. As the golfer practices with the guideline device, he will soon learn which position he prefers. FIG. 15 shows the proper image pattern for a golf ball B14 before starting the backswing, the ball being centered in the middle target space 211 of the guideline device 212. FIG. 15 also illustrates the proper image pattern at the top of the backswing for golfers with restricted or short backswings and no head or body movement. This image pattern can also be used as a control device for partial iron shots.

FIG. 16 shows the proper image pattern for guideline device 210 of FIG. 15 and ball B14 for a golfer who has moved his head slightly by the time his club is at the top of its backswing. The apparent position of ball B14 has moved from the center target space 211 to the center of front target space 214.

FIG. 17 shows the image pattern for guideline device 210 and golf ball B14 for a golfer who prefers a long, loose swing and thus considerable head movement at the top of his backswing. The apparent position of ball B14 has moved from center target space 211 to a position forwardly of front target space 214, indicating a substantial amount of head or body movement or both. In fact, head moving, free swinging golfers may use the FIG. 17 image pattern to make sure they exercise a complete pivot during the execution of their backswing. For example, the golfer may move his head before or after the start of his backswing. In either case, he is assured of the proper pivot when his left shoulder is parallel to the vertical guidelines and in line with the ball.

Having described several embodiments of the invention, it should be apparent to those having skill in the art that the same permits of modification in arrangement and detail.

I claim:
1. A sight guide device comprising:
a sight guideline means extending generally horizontally and vertically and including guide segments spaced horizontally from one another to define a plurality of horizontally separated target spaces between said segments,
and support means for mounting said sight guideline means on the person of a user directly in front of and close to said user's eye so that a target object remote from said guideline means can be aligned with said target spaces.

2. A sight guide device comprising:
a horizontally extending sight guide element,
a plurality of generally vertically extending sight guide elements extending at spaced intervals from said horizontally extending sight guide element so as to define target spaces between said vertically extending elements,
and guide element support means for mounting said elements on the person of a user in front of at least one of said user's eyes.

3. A device according to claim 2 including at least two spaced horizontally extending guide elements intersecting said vertically extending guide elements so as to define closed target spaces.

4. A device according to claim 1 wherein there are at least four of said line segments defining three of said target spaces.

5. A device according to claim 1 wherein said mounting means includes a spectacle-type frame having ear-pieces and a nose-piece.

6. A device according to claim 1 wherein said mounting means includes means for supporting said guideline means on a spectacle frame with said guideline means arranged in front of one of the eye openings of said frame.

7. A device according to claim 2 wherein said horizontally extending and vertically extending guide elements define rigid bars joined together in a rigid guide unit, said mounting means including a spectacle-type frame defining an eye opening and having ear-pieces and a nose-piece, and means mounting said guide unit in a position spaced in front of said eye opening.

8. A device according to claim 2 wherein said horizontal and vertical guide elements comprise rigid bars joined together and means for adjusting the distances between said vertically extending guide elements to vary the size of said target spaces.

9. A device according to claim 2 including at least two horizontally extending guide elements and means for adjusting the distance between said guide elements.

References Cited

UNITED STATES PATENTS 3,343,268    9/1967    Schennum    33—174
2,992,005    7/1961    Lockhart    273—183

LEONARD FORMAN, Primary Examiner

F. J. D'AMBROSIO, Assistant Examiner

U.S. Cl. X.R.

273—183